United States Patent
Matsuda

(10) Patent No.: US 10,303,231 B2
(45) Date of Patent: May 28, 2019

(54) POWER SUPPLY DEVICE WHICH PERFORMS OPERATIONS WHILE SUPPRESSING INFLUENCE DUE TO UPDATING OF FIRMWARE

(71) Applicant: Panasonic Intellectual Property Management Co., Ltd., Osaka (JP)

(72) Inventor: Takashi Matsuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 15/326,868

(22) PCT Filed: Sep. 16, 2015

(86) PCT No.: PCT/JP2015/004723
§ 371 (c)(1),
(2) Date: Jan. 17, 2017

(87) PCT Pub. No.: WO2016/051701
PCT Pub. Date: Apr. 7, 2016

(65) Prior Publication Data
US 2017/0205861 A1    Jul. 20, 2017

(30) Foreign Application Priority Data
Sep. 30, 2014  (JP) ................. 2014-200323

(51) Int. Cl.
*G06F 1/26* (2006.01)
*G06F 1/32* (2019.01)
(Continued)

(52) U.S. Cl.
CPC ............... *G06F 1/263* (2013.01); *G06F 1/28* (2013.01); *G06F 1/3287* (2013.01); *G06F 8/654* (2018.02);
(Continued)

(58) Field of Classification Search
None
See application file for complete search history.

(56) References Cited

U.S. PATENT DOCUMENTS

2010/0213891 A1* 8/2010 Nishikawa ............ H01M 10/42
320/106
2016/0226262 A1* 8/2016 Fukubayashi ....... H01M 10/425

FOREIGN PATENT DOCUMENTS

JP   2011-083147   4/2011
WO  2015/033660   3/2015

OTHER PUBLICATIONS

International Search Report of PCT application No. PCT/JP2015/004723 dated Dec. 8, 2015.

* cited by examiner

*Primary Examiner* — Kim Huynh
*Assistant Examiner* — Danny Chan
(74) *Attorney, Agent, or Firm* — McDermott Will & Emery LLP

(57) ABSTRACT

An input part sets either a charge time zone or a discharge time zone. A first firmware storage part stores first firmware defining all operation contents of a power supply device. An acquiring part acquires second firmware that is firmware for update, and a second firmware storage part stores the second firmware. A controller refers to the charge time zone, the discharge time zone and the like received from the input part to extract a first time zone in which neither the charge time zone nor the discharge time zone is set. The controller preferentially sets timing for updating firmware in the first time zone.

2 Claims, 5 Drawing Sheets

(51) Int. Cl.
*G06F 1/3287* (2019.01)
*G06F 1/28* (2006.01)
*G06F 9/445* (2018.01)
*G06F 8/654* (2018.01)
*H02J 3/32* (2006.01)
*H02J 7/00* (2006.01)
*H02J 7/04* (2006.01)
*H02J 9/06* (2006.01)

(52) U.S. Cl.
CPC ............... *G06F 9/445* (2013.01); *H02J 3/32* (2013.01); *H02J 7/0031* (2013.01); *H02J 7/041* (2013.01); *H02J 9/062* (2013.01); *H02J 2007/004* (2013.01); *H02J 2007/0037* (2013.01); *Y02D 10/42* (2018.01)

| Pattern | Start time | Finish time |
|---|---|---|
| Charge 1 | 0:00 | 8:00 |
| Discharge 1 | 10:00 | 16:00 |
| Discharge 2 | 18:00 | 22:00 |

(b)

| Pattern | Start time | Finish time |
|---|---|---|
| Charge 2 | 0:00 | 10:00 |
| Discharge 3 | 10:00 | 0:00 |

POWER SUPPLY DEVICE WHICH PERFORMS OPERATIONS WHILE SUPPRESSING INFLUENCE DUE TO UPDATING OF FIRMWARE

TECHNICAL FIELD

The present invention relates to a power supply device capable of updating firmware.

BACKGROUND ART

A widely known power supply device includes a secondary battery such as lithium-ion battery, and backs up supplying of power from the secondary battery if a commercial alternating current power supply fails to supply electric power. Such a power supply device can sometimes be used for so-called peak shaving or peak shifting electric power to be used to lower a maximum value of use of commercial electric power in daytime by setting the power supply device to charge electricity in a night time zone, and discharge electricity in a daytime zone during which electric power is used in a large amount. Firmware is generally used to achieve a function for charging and discharging of the secondary battery and a function for protecting the secondary battery if an abnormality occurs. Such firmware is normally incorporated in the power supply device. However, when the firmware incorporated in the power supply device is updated for adding functionality, and for correcting failures, the functions achieved through the firmware might be stopped during updating, thus, some operations set by a user could not be achieved. With a conventional method, firmware is temporarily updated, any error in a battery pack is detected, a check is performed again if an error is detected, and the firmware is actually updated when no error is detected in a re-check for errors (see PTL 1 shown below).

CITATION LIST

Patent Literature

PTL 1: Unexamined Japanese Patent Publication No. 2011-83147

SUMMARY OF THE INVENTION

With the above described conventional method, firmware may be updated, but an operation set by a user cannot sometimes securely be achieved because the update takes place in a time zone during which the operation should be performed.

In view of the above described problems, an object of the present invention is to provide a power supply device capable of performing operations set by a user while suppressing influence due to updating of firmware.

A power supply device according to the present invention, which includes a secondary battery, charges the secondary battery with electricity supplied from a commercial power supply, and causes the secondary battery to discharge the charged electricity to a load, and the power supply device includes an input part for setting a charge time zone for charging the secondary battery with electricity, or a discharge time zone for causing the secondary battery to discharge electricity, a storage part for storing first firmware defining all operation contents of the power supply device, an acquiring part for acquiring second firmware for updating the first firmware, and a controller for executing the first firmware stored in the storage part to control an entirety of the power supply device. The controller prioritizes a first time zone in which neither the charge time zone nor the discharge time zone is set to update the first firmware stored in the storage part with the second firmware.

According to the present invention, a power supply device capable of performing operations set by a user can be provided while suppressing influence due to updating of firmware.

BRIEF DESCRIPTION OF DRAWINGS

FIG. 4 is a view illustrating charge/discharge setting table information according to the exemplary embodiment of the present invention.

DESCRIPTION OF EMBODIMENT

Figure 1:
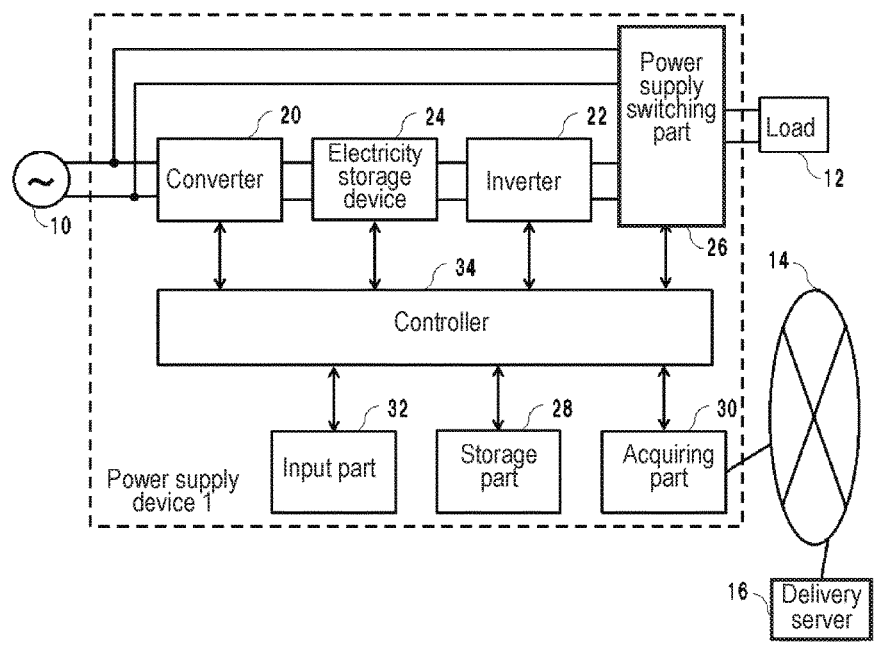
FIG. 1 is a view illustrating a power supply device according to an exemplary embodiment of the present invention.

A summary of an exemplary embodiment of the present invention will now be described prior to specifically describing the exemplary embodiment of the present invention. A power supply device incorporates a program to be executed by a Central Processing Unit (CPU) or another device, and firmware configured by data to be referred to when the program is executed. The firmware defines operation contents of the power supply device. This means that updating the firmware causes operations achieved by the firmware to stop, and requires a certain time. As a result, when a user has set a time zone during which charging or discharging should be operated, and the firmware is updated in the time zone, the operation set by the user could be interrupted.

To solve this problem, in the exemplary embodiment of the present invention, when a charge time zone during which a secondary battery should be charged with electricity, or a discharge time zone during which the secondary battery should be caused to discharge electricity, firmware is preferentially updated in a time zone in which neither the charge time zone nor the discharge time zone is set. Therefore, the firmware is less likely to be updated in a time zone in which operations set by a user should be performed. As a result, updating of the firmware can be achieved while suppressing influence on the operations set by the user.

With reference to the drawings, a first exemplary embodiment of the present invention will now be described herein. In the drawings to be referred to, identical components are denoted by identical reference marks, and descriptions with regard to the identical components are not repeated in general.

FIG. 1 is a view illustrating power supply device 1 according to the exemplary embodiment of the present invention. This exemplary embodiment assumes that power supply device 1 is a power supply device that is coupled to commercial alternating current power supply 10 to supply alternating current electric power to load 12 for backup if commercial alternating current power supply 10 fails to supply electric power, and that is set to charge electricity in a night time zone, and to discharge electricity in a daytime zone for peak shaving electric power to be used. Power supply device 1 includes converter 20, inverter 22, electricity storage device 24, power supply switching part 26, storage part 28, acquiring part 30, input part 32, and controller 34.

Converter 20 follows an instruction given by controller 34 to convert alternating current electric power supplied from commercial alternating current power supply 10 into direct current electric power, and to supply the direct current electric power to electricity storage device 24 to charge electricity storage device 24. In addition, converter 20 follows an instruction given by controller 34 during charging to control a charge voltage and a charge current.

Inverter 22 follows an instruction given by controller 34 to cause electricity storage device 24 to discharge electricity, and to convert direct current electric power supplied from electricity storage device 24 into alternating current electric power to supply the alternating current electric power to power supply switching part 26. In addition, inverter 22 follows an instruction given by controller 34 during discharging to control a discharge voltage and a discharge current.

Figure 2:
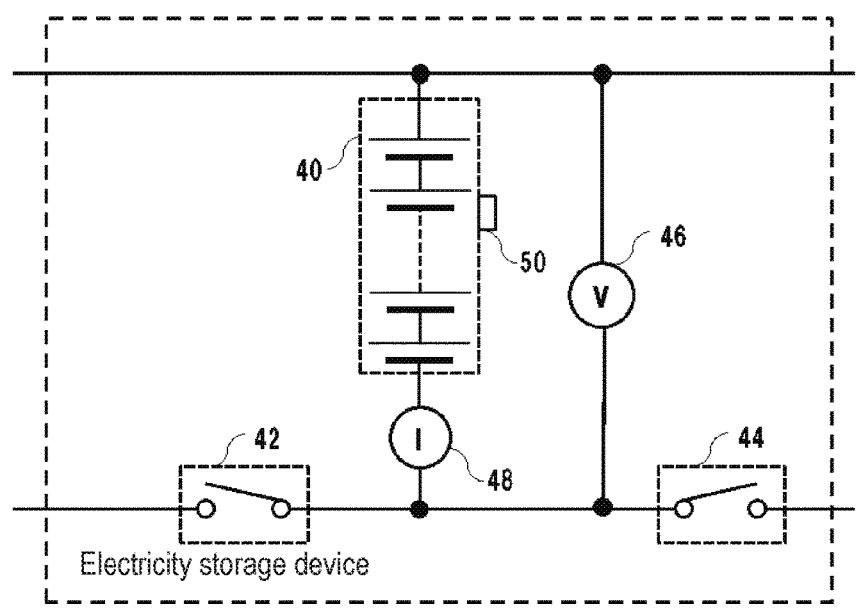
FIG. 2 is a view illustrating an electricity storage device according to the exemplary embodiment of the present invention.

FIG. 2 is a view illustrating electricity storage device 24 according to the exemplary embodiment of the present invention. Electricity storage device 24 includes battery module 40, charge switch 42, discharge switch 44, voltage measuring part 46, current measuring part 48, and temperature measuring part 50.

Battery module 40 is configured by one or more secondary batteries. The secondary batteries included in battery module 40 are, for example, lithium-ion batteries, or nickel-hydride batteries. In FIG. 2, although battery module 40 is configured by a plurality of secondary batteries connected in series each other, a single secondary battery may be used to configure battery module 40. In addition, part or all of secondary batteries included in battery module 40 may be connected in parallel each other. In the exemplary embodiment, unless otherwise specifically described, discharging and charging mean that discharging of electricity from battery module 40 and charging with electricity of battery module 40.

Charge switch 42 is a switching element disposed between converter 20 and current measuring part 48. Discharge switch 44 is a switching element disposed between inverter 22 and current measuring part 48. As a switching element, for example, n-type Metal-Oxide-Semiconductor Field-Effect Transistor (MOSFET) that is one of semiconductor switches may be used. Instead of an n-type MOSFET, an Insulated Gate Bipolar Transistor (IGBT), a GaN transistor, SiC transistor, and the like may be used.

Voltage measuring part 46 is disposed between battery module 40 and discharge switch 44 to detect a voltage value Vd of a terminal voltage of each of the plurality of secondary batteries configuring battery module 40 (a potential difference between a positive electrode and a negative electrode of each of the plurality of secondary batteries). Voltage measuring part 46 outputs the detected voltage value Vd of each of the secondary batteries to controller 34. Current measuring part 48 (for example, shunt resistor) is disposed between battery module 40 and charge switch 42 and discharge switch 44 to measure a current value Id of a current flowing into battery module 40. Current measuring part 48 outputs the detected current value Id to controller 34. Temperature measuring part 50 (for example, thermistor) detects a temperature Td of battery module 40 (for example, a surface temperature of battery module 40). Temperature measuring part 50 outputs the detected temperature Td to controller 34.

Now back to FIG. 1. Power supply switching part 26 is supplied with alternating current electric power from both commercial alternating current power supply 10 and inverter 22. Power supply switching part 26 follows an instruction given by controller 34 to select either the alternating current electric power supplied from commercial alternating current power supply 10 or the alternating current electric power supplied from inverter 22 to supply the selected alternating current electric power to load 12.

Figure 3:
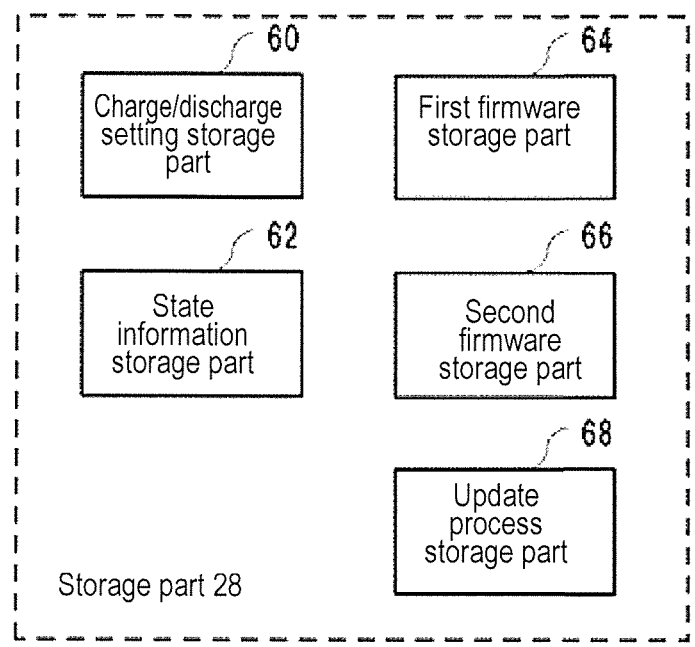
FIG. 3 is a view illustrating a storage part according to the exemplary embodiment of the present invention.

FIG. 3 is a view illustrating storage part 28 according to the exemplary embodiment of the present invention. As storage part 28, an Erasable Programmable Read Only Memory (EPROM) or a nonvolatile memory such as NOR-type flash memory that is one of flash memories may be used. Storage part 28 includes charge/discharge setting storage part 60, state information storage part 62, first firmware storage part 64, second firmware storage part 66, and update process storage part 68.

Charge/discharge setting storage part 60 stores either a charge time zone during which electricity should be charged or a discharge time zone during which electricity should be discharged, which is set via input part 32, as charge/discharge setting table information formatted in a table. FIG. 4 is a view illustrating charge/discharge setting table information according to the exemplary embodiment of the present invention. As shown in FIG. 4, charge/discharge setting table information describes a charge pattern or a discharge pattern added with a corresponding start time and a corresponding finish time. In the charge/discharge setting table information shown in the sections (a) and (b) of FIG. 4, information for identifying the charge pattern or the discharge pattern is described in a pattern column. In each pattern, a start time for a corresponding pattern is described in a start time column, while a finish time for the corresponding pattern is described in a finish time column. By referring to the charge/discharge setting table information shown in FIG. 4, controller 34 is able to know a time zone in which neither a charge time zone nor a discharge time zone is set (also referred to as a first time zone). To describe with a specific example, with reference to the charge/discharge setting table information shown in the section (a) of FIG. 4, controller 34 determines that a time zone from 8:00 to 10:00 inclusive, a time zone from 16:00 to 18:00 inclusive, and a time zone from 22:00 to 0:00 inclusive correspond to first time zones. On the other hand, with reference to the charge/discharge setting table information shown in the section (b) of FIG. 4, controller 34 determines that no first time zone is present.

Now back to FIG. 3. State information storage part 62 stores battery state data including the current value Id, the voltage value Vd, and the temperature Td, and, in addition, stores state information including a State Of Charge (SOC) that is an index indicating a charge state (also referred to as a charging rate) of battery module 40, which is calculated using the battery state data, a State Of Health (SOH) that is an index indicating a degradation degree, and internal resistance R. First firmware storage part 64 stores firmware before updated (also referred to as first firmware). Second firmware storage part 66 stores firmware for adding functionality to the first firmware, and for correcting an error in the first firmware (also referred to as second firmware). Update process storage part 68 stores a boot loader program for reading the first firmware from first firmware storage part 64 in a normal operation, and for rewriting the first firmware stored in first firmware storage part 64 with the second firmware in an update operation, and stores update process control information to be referred to when an update process is executed, and stores other information.

Now back to FIG. 1. Acquiring part 30 acquires firmware for update from delivery server 16 that delivers the firmware for update via network 14 configured by a radio communication network such as Long Term Evolution (LTE) or a cable communication network using optical fibers. Acquiring part 30 can also acquire firmware for update, which is delivered using an optical medium such as a Compact Disk (CD) or Digital Versatile Disk (DVD) or a semiconductor memory such as NAND-type flash memory that is one of flash memories. Acquiring part 30 causes second firmware storage part 66 to store the acquired firmware for update via controller 34.

Input part 32 is configured by, for example, a Liquid Crystal Display (LCD) panel through which a user of power supply device 1 enters, while referring to information shown on the LCD panel, a start time for starting charging (also referred to as a charge start time), and a finish time for finishing the charging (also referred to as a charge finish time) to set a charge time zone for charging battery module 40. The user can also use input part 32 to set, in the charge time zone, an amount of charge with which battery module 40 is charged with electricity. Similarly, the user can also use input part 32 to enter a start time for starting discharging (also referred to as a discharge start time), and a finish time for finishing the discharging (also referred to as a discharge finish time) to set a discharge time zone for causing battery module 40 to discharge electricity, and, in addition, to set, in the discharge time zone, an amount of discharge with which battery module 40 is caused to discharge electricity. Input part 32 outputs the set charge time zone, the set discharge time zone and the like, to controller 34.

Controller 34 controls an entirety of or whole power supply device 1. First, controller 34 controls a state of battery module 40, such as SOC. To this end, controller 34 uses the battery state data to estimate an SOC, an SOH, an internal resistance R, and the like of battery module 40.

Controller 34 integrates, for example, the current value Id received from current measuring part 48 to estimate an SOC of each of the secondary batteries. Controller 34 may also estimate an open-circuit voltage (also referred to as an OCV) of each of the secondary batteries based on the voltage value Vd received from voltage measuring part 46, and may estimate an SOC by referring to an SOC-OCV table describing a relationship between the SOC and OCV.

Controller 34 follows, for example, Formula (1) and Formula (2) shown below to estimate an SOH of each of the secondary batteries, based on a value of change in the estimated SOC and a current value integrated in a period required for the change.

$$SOH = (FCC/Ci) \times 100 \quad (1)$$

$$FCC = (Qt/\Delta SOC) \times 100 \quad (2)$$

Where, in each of the formulas, Full Charge Capacity (FCC) indicates a full charge capacity of a secondary battery, Ci indicates an initial capacity (design capacity) of the secondary battery, $\Delta$SOC indicates a value of change in an SOC, and Qt indicates a capacity in a period required for $\Delta$SOC (integrated current value). That is, the SOH is defined with a ratio between the initial capacity Ci and the full charge capacity FCC. Additionally, as is apparent from the definition of SOH, the greater a degradation degree, the smaller an SOH.

While taking into account the estimated SOH and the temperature Td received from temperature measuring part 50, for example, controller 34 refers to an SOC-R table describing a relationship between SOC and internal resistance R to estimate an internal resistance R. Controller 34 causes state information storage part 62 to store, at predetermined timing, the battery state data and the state information including the estimated SOC, SOH, and internal resistance R.

In addition, controller 34 refers to the battery state data, the estimated SOC, and the like to detect an abnormal state such as over-discharge or over-charge. Upon an abnormal state is detected, controller 34 protects battery module 40 by operating charge switch 42 or discharge switch 44 to an open state, or by taking other measures.

In addition, based on the charge time zone, the discharge time zone, and other information received from input part 32, controller 34 causes converter 20 to execute a charge control, or causes inverter 22 to execute a discharge control. Controller 34 forms charge/discharge setting table information based on the received charge time zone and the received discharge time zone, and causes charge/discharge setting storage part 60 to store the charge/discharge setting table information.

In addition, controller 34 controls and causes power supply switching part 26 to execute a control for switching electric power between alternating current electric power supplied from commercial alternating current power supply 10 and alternating current electric power supplied from inverter 22. For example, if an abnormality occurs, such as if commercial alternating current power supply 10 fails to supply electric power, controller 34 instructs power supply switching part 26 to switch electric power to the alternating current electric power supplied from inverter 22 to supply the alternating current electric power to load 12. In addition, upon commercial alternating current power supply 10 is recovered, controller 34 instructs power supply switching part 26 to switch the electric power to the alternating current electric power supplied from commercial alternating current power supply 10 to supply the alternating current electric power to load 12.

Furthermore, controller 34 executes a process for updating firmware. To this end, controller 34 refers to the charge/discharge setting table information stored in charge/discharge setting storage part 60, and, in addition, calculates a time required for updating the firmware (also referred to as a first required time) to extract a first time zone in which neither the charge time zone nor the discharge time zone is set. Upon the first time zone is extracted, controller 34 preferentially sets, in the first time zone, timing for executing the process for updating the firmware (also referred to as update timing). If no time zone in which neither the charge time zone nor the discharge time zone is set is present, and no first time zone could be extracted, controller 34 sets update timing that is a predetermined time earlier than the charge finish time or the discharge finish time. This is because charging or discharging rarely continues by the charge finish time or the discharge finish time, and updating the firmware immediately before the charge finish time or the discharge finish time can prevent as much as possible a charge operation or a discharge operation set by a user from being interrupted.

When update timing is to be set in a time zone included in either the charge time zone or the discharge time zone (also referred to as a second time zone), controller 34 sets the update timing in a time zone that is the first required time or more, prior to the charge finish time or the discharge finish time. That is, controller 34 sets the update timing so that an interval between the update timing and the charge finish time or the discharge finish time is greater than the first required time. If an interval between the update timing and the charge finish time or the discharge finish time is shorter than the first required time, the firmware could not be updated by the charge finish time or the discharge finish time. In this case, although another charge pattern or another discharge pattern has been set to start in succession to a charge pattern or discharge pattern that is about to finish, execution of the other charge pattern or discharge pattern could be interrupted until the firmware is updated. To prevent the execution of the other charge pattern or discharge pattern from being interrupted, controller 34 sets update timing at where an interval between the update timing and the charge finish time or the discharge finish time is greater than the first required time.

When an update timing is to be set in the second time zone, controller 34 can also calculate a time required for finishing charging or discharging (second required time) to set the update timing in a time zone that is the second required time or more after the charge start time or the discharge start time, and that is earlier than the first required time from the charge finish time or the discharge finish time (also referred to as a third time zone). Therefore, without interrupting both an operation of a charge pattern or a discharge pattern set in a time zone including timing for updating the firmware, and an operation of another charge pattern or another discharge pattern set in succession, the firmware can be updated. By referring to the amount of charge or the amount of discharge received from input part 32, the current value Id received from current measuring part 48, the estimated SOC, and other values, controller 34 can calculate the second required time. In addition, controller 34 can also cause storage part 28 to store, as history information, a time when a charge pattern or a discharge pattern is started from a charge start time or a discharge start time, and a time when the charge pattern or the discharge pattern is actually finished, apply a statistical process to this history information (for example, calculations of an average value and a maximum value), and calculate the second required time. Additionally, upon controller 34 detecting a change in setting of the charge time zone or the discharge time zone, controller 34 can set again update timing.

When a plurality of charge patterns or discharge patterns is set, controller 34 sets update timing in a pattern including the third time zone. If no pattern including the third time zone is present in the plurality of charge patterns or discharge patterns, controller 34 sets update timing in a pattern where a length of the charge time zone or the discharge time zone is closest to a total of the first required time and the second required time. Therefore, a length of a period during which a charge pattern or a discharge pattern is interrupted can be shortened to a minimum.

To execute updating of the firmware, controller 34 generates update flag information instructing updating, and update process control information including positional information of second firmware storage part 66, and causes update process storage part 68 to store the update flag information and the update process control information.

While the boot loader program is being executed, controller 34 refers to the update process control information stored in update process storage part 68. When the update flag information is referred to, and the update flag information instructs execution of an update (for example, the update flag information is set), controller 34 clears the update flag information, and, based on the positional information, rewrites the first firmware stored in first firmware storage part 64 with the second firmware stored in second firmware storage part 66. After that, controller 34 performs a reset operation for restarting with the first firmware.

Figure 5:
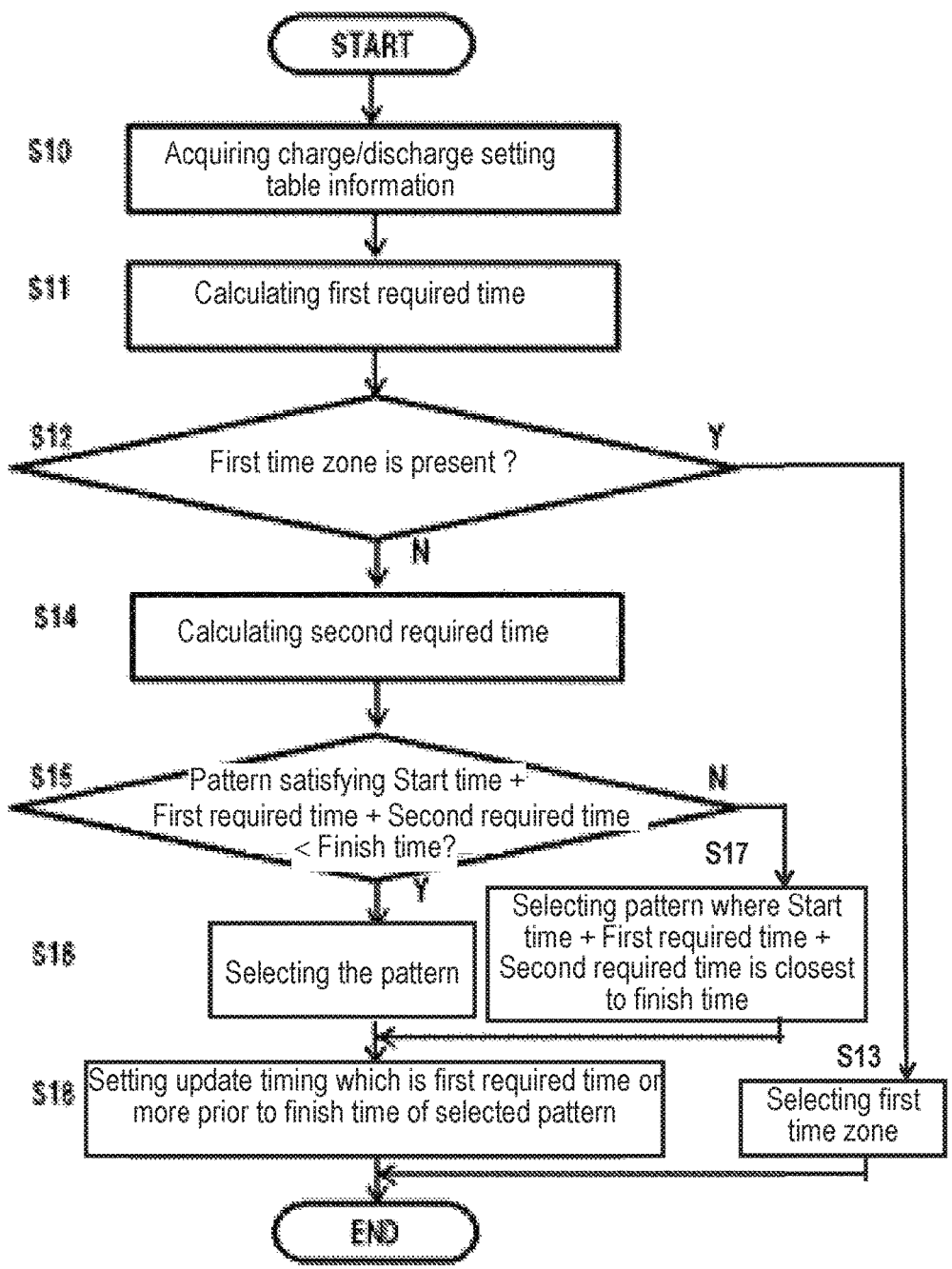
FIG. 5 is an operation flowchart with regard to controlling of determination of timing for updating firmware.

Operations of controller 34 configured as shown above will now be described herein. FIG. 5 is an operation flowchart with regard to controlling of determination of timing for updating firmware. Controller 34 acquires the charge/discharge setting table information from charge/discharge setting storage part 60 (S10). Controller 34 calculates a first required time (S11). Controller 34 refers to the charge/discharge setting table information and the first required time to check whether a first time zone in which neither a charge time zone nor a discharge time zone is set is present (S12). When the first time zone is present (Y in S12), controller 34 preferentially sets update timing in the first time zone (S13). If no first time zone is present (N in S12), controller 34 calculates a second required time (S14). For all charge patterns or discharge patterns included in the charge/discharge setting table information, controller 34 checks whether a pattern where a length of a charge time zone or a discharge time zone is shorter than a total of the first required time and the second required time is present (i.e. a pattern satisfying Start time+First required time+Second required time<Finish time) (S15). When a pattern where a length of a charge time zone or a discharge time zone is shorter than the total of the first required time and the second required time is present (Y in S15), the pattern is selected (S16). When no pattern where a length of a charge time zone or a discharge time zone is shorter than the total of the first required time and the second required time is present (N in S15), a pattern where the length of the charge time zone or the discharge time zone is closest to the total of the first required time and the second required time (i.e. a pattern where Start time+First required time+Second required time is closest to the finish time) is selected (S17). Controller 34 sets update timing in a time zone that is the first required time or more prior to the finish time of the selected pattern (S18).

According to the exemplary embodiment of the present invention, input part 32 sets a charge time zone or a discharge time zone. First firmware storage part 64 stores the first firmware defining all operation contents of power supply device 1. Acquiring part 30 acquires second firmware that is firmware for update, and second firmware storage part 66 stores the second firmware. Controller 34 refers to the charge time zone, the discharge time zone, or other time zones received from input part 32 to extract a first time zone in which neither the charge time zone nor the discharge time zone is set. Controller 34 preferentially sets timing for updating the firmware in the first time zone. Therefore, updating of the firmware can be executed in a time zone in which neither a charge time zone nor a discharge time zone is set, thus a discharge operation or a charge operation set by a user can be performed while suppressing influence due to updating of the firmware. If no first time zone can be extracted, controller 34 sets update timing in a second time zone that is included in a charge time zone or a discharge time zone, and that is the first required time or more prior to a charge finish time or a discharge finish time. Therefore, updating of the firmware can be executed before a next charge pattern or a next discharge pattern starts, and an operation set by a user can securely be executed. Controller 34 calculates a second required time, and sets update timing in a time zone that is the second required time or more after a charge start time or a discharge start time, and that is the first required time or more prior to a charge finish time or a discharge finish time. Therefore, neither an operation of a charge pattern or a discharge pattern set in a time zone including timing for updating the firmware, nor an operation of another charge pattern or another discharge pattern set in succession is interrupted, thus an operation set by a user can securely be executed.

The present invention has been described with the exemplary embodiment. This exemplary embodiment is merely an example, and those skilled in the art will understand that the components and processes of the exemplary embodiment can variously be combined and modified, and those exemplary modifications are also in the scope of the present invention.

Additionally, the present invention represented with this exemplary embodiment may be identified with items described below.

[Item 1]

A power supply device, which includes a secondary battery, charges the secondary battery with electricity supplied from a commercial power supply, causes the secondary battery to discharge the charged electricity to a load, includes an input part for setting a charge time zone for charging the secondary battery with electricity, or a discharge time zone for causing the secondary battery to discharge electricity, a storage part for storing first firmware defining all operation contents of the power supply device, an acquiring part for acquiring second firmware for updating the first firmware, and a controller for executing the first firmware stored in the storage part to control an entirety of the power supply device. The controller prioritizes a first time zone in which neither the charge time zone nor the discharge time zone is set to update the first firmware stored in the storage part with the second firmware.

[Item 2]

The power supply device according to Item 1, wherein when the update is to be performed in a second time zone included in the charge time zone or the discharge time zone, the controller performs the update in the second time zone that is a first required time or more required for performing the update, prior to a finish time of the charge time zone or a finish time of the discharge time zone set through the input part.

[Item 3]

The power supply device according to Item 2, wherein the controller calculates a second required time required for finishing the charging or the discharging, and performs the update in a second time zone that is the second required time or more, after a start time of the charge time zone or a start time of the discharge time zone set through the input part.

INDUSTRIAL APPLICABILITY

A power supply device according to the present invention is useful to a backup power supply and the like.

The invention claimed is:

1. A power supply device which includes a secondary battery, charges the secondary battery with electricity supplied from a commercial power supply, and causes the secondary battery to discharge the charged electricity to a load, the power supply device comprising:
   an input device for setting a charge time zone for charging the secondary battery with electricity, or a discharge time zone for causing the secondary battery to discharge electricity;
   a storage device for storing first firmware defining all operation contents of the power supply device;
   an acquiring device for acquiring second firmware for updating the first firmware; and
   a controller for executing the first firmware stored in the storage device to control an entirety of the power supply device,
   wherein the controller prioritizes a first time zone in which neither the charge time zone nor the discharge time zone is set to update the first firmware stored in the storage device with the second firmware,
   wherein the controller determines a first amount of time required for the update;
   wherein when the update is to be performed in a window of time included in the charge time zone or the discharge time zone, the controller starts the update by the first amount of time before a finish time of the charge time zone or a finish time of the discharge time zone set through the input device.

2. The power supply device according to claim 1, wherein the controller calculates a second amount of time required for finishing the charging or the discharging in the charge or discharge time zone, and starts the update in the window of time at or after the second amount of time after a start time of the charge time zone or a start time of the discharge time zone set through the input device.

* * * * *